US010795365B2

(12) United States Patent
Nishita et al.

(10) Patent No.: US 10,795,365 B2
(45) Date of Patent: Oct. 6, 2020

(54) MOVABLE BODY PHOTOGRAMMETRY SURVEY SYSTEM

(71) Applicant: TOPCON CORPORATION, Itabashi-Ku, Tokyo (JP)

(72) Inventors: Nobuyuki Nishita, Tokyo (JP); Mitsuru Ogawa, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 106 days.

(21) Appl. No.: 15/962,037

(22) Filed: Apr. 25, 2018

(65) Prior Publication Data

US 2018/0314257 A1 Nov. 1, 2018

(30) Foreign Application Priority Data

May 1, 2017 (JP) .................................. 2017-091452

(51) Int. Cl.
| | | |
|---|---|---|
| *H04N 7/18* | (2006.01) | |
| *G05D 1/00* | (2006.01) | |
| *G01C 11/02* | (2006.01) | |
| *G01C 15/06* | (2006.01) | |
| *G01C 11/06* | (2006.01) | |
| *G05D 1/10* | (2006.01) | |
| *G01C 15/00* | (2006.01) | |

(52) U.S. Cl.
CPC ............ *G05D 1/0094* (2013.01); *G01C 11/02* (2013.01); *G01C 11/06* (2013.01); *G01C 15/06* (2013.01); *G05D 1/101* (2013.01); *G01C 15/002* (2013.01)

(58) Field of Classification Search
CPC ...... G05D 1/0094; G05D 1/101; G01C 11/02; G01C 15/06; G01C 11/06; G01C 15/002
See application file for complete search history.

(56) References Cited

U.S. PATENT DOCUMENTS

| | | |
|---|---|---|
| 8,666,571 B2 | 3/2014 | Ohtomo et al. |
| 9,007,461 B2 | 4/2015 | Ohtomo et al. |
| 9,013,576 B2 | 4/2015 | Ohtomo et al. |
| 9,409,656 B2 | 8/2016 | Ohtomo et al. |
| 9,736,360 B2 | 8/2017 | Sasaki et al. |
| 2012/0300070 A1 | 11/2012 | Ohtomo et al. |
| 2013/0135440 A1 | 5/2013 | Ohtomo et al. |
| 2015/0116693 A1* | 4/2015 | Ohtomo ............... G01C 15/002 356/4.01 |
| 2018/0259652 A1* | 9/2018 | Shimizu ................. G01S 17/89 |

FOREIGN PATENT DOCUMENTS

JP 2013-108927 A 6/2013

* cited by examiner

*Primary Examiner* — Richard T Torrente
(74) *Attorney, Agent, or Firm* — Chiesa Shahinian & Giantomasi PC

(57) ABSTRACT

A photogrammetry analysis unit of an analysis device associates the survey result obtained by a surveying device with a photographing position of each image taken by a camera, recognizes the surveying device from the image containing the surveying device, corrects the photographing position based on the known point coordinates of the surveying device, and generates the data for photogrammetry.

9 Claims, 8 Drawing Sheets

MOVABLE BODY PHOTOGRAMMETRY SURVEY SYSTEM

CROSS-REFERENCE TO RELATED APPLICATION

This application claims priority to Japanese Patent Application No. 2017-091452 filed on May 1, 2017, the entire disclosure of which is incorporated by reference herein.

TECHNICAL FIELD

The present disclosure relates to a photogrammetry system that includes a movable photographing device taking images for photogrammetry and a surveying device determining a position of the movable photographing device.

BACKGROUND

In typically known stereophotogrammetry, a movable body includes a camera, which takes images (static images and dynamic images) from two or more different positions, the images being used for a survey.

In particular, in recent photogrammetry, an unmanned aerial vehicle (UAV) is used as a movable body including a camera, which takes images from the sky.

In such photogrammetry, a spatial position of each image taken is adjusted to generate a stereo model of target areas.

For example, in Japanese Unexamined Patent Publication No. 2013-108927, a flying body flies in the sky above target survey areas in a meandering manner to take images. This photographing operation is periodically conducted so that each image overlaps an image adjacent thereto in the travelling direction by a predetermined amount, and overlaps an image adjacent thereto in an adjacent course by a predetermined amount. After all the photographing operations are completed, one pair of two adjacent ones of three images consecutive in the travelling direction is fixed so that one stereo image is produced. The other pair of two adjacent ones of the three images is also fixed so that the other image is produced. Feature points extracted from a portion shared by the three images in the image shared by the two stereo images are used to connect the two stereo images. Moreover, a tie point shared by the images adjacent to each other in the adjacent course is selected to connect the stereo images adjacent to each other in the course. Consequently, all the target survey areas are covered. In this manner, a unified stereo image (a stereo model) represented by the shared three-dimensional coordinate system is produced.

However, the stereo model generated by combination of the images taken as in Japanese Unexamined Patent Publication No. 2013-108927 can be used for analysis of relative positions, but cannot be used for definition of absolute scales (distances), positions, and rotation. Then, the ultimately absolute coordinates cannot be determined.

In Japanese Unexamined Patent Publication No. 2013-108927, the absolute coordinates of the flying body during a photographing operation are determined by a global positioning system (GPS). Then, the photographing position determined by the GPS is less accurate than the position, determined by the total station (surveying device), of the flying body.

When the position of the UAV is determined by the total station, the total station is away from the camera of the UAV during a photographing operation. Thus, it is necessary to associate the photographing positions of the camera with the survey result.

In addition, the control points (of which the coordinates are known) may be framed in all the images to associate the image with the ground point to determine absolute coordinates. However, in this case, it is necessary to frame at least four control points. Thus, the photographing operation is limited. In addition, it is necessary to determine the absolute coordinates of each control point in a target survey area in advance to set the control points. It is also necessary to set an air mark indicating the control point to clearly frame the control point in the image. As such, some effort is required.

In view of the foregoing, it is an object of the present disclosure to provide a survey system conducting a photogrammetry analysis containing association of a photographing position taken by a camera of a movable body with a survey result obtained by a surveying device tracking and surveying the camera where the accuracy of photogrammetry can be improved without installation of air marks.

SUMMARY OF THE EMBODIMENTS

To achieve the object, the survey system of an embodiment of the present disclosure includes a photographing unit provided in a movable body and taking a plurality of images for photogrammetry, each image partially overlapping with another image adjacent thereto; a surveying unit provided in a known position, having a known point coordinates, tracking the photographing unit, and determining a position of the photographing unit; a photographing control unit controlling the movable body and the photographing unit to take at least one image containing the surveying unit in taking the plurality of images for photogrammetry; and a photogrammetry analysis unit associating a survey result obtained by the surveying unit with a photographing position of each image taken by the photographing unit, recognizing the surveying unit from the image containing the surveying unit, and correcting the photographing position based on the known point coordinates of the surveying unit, to generating data for photogrammetry.

An embodiment of the present disclosure containing the above configuration can provide a survey system conducting a photogrammetry analysis containing association of a photographing position taken by a camera of a movable body with a survey result obtained by a surveying device tracking and surveying the camera where the accuracy of photogrammetry can be improved without installation of air marks.

DESCRIPTION OF THE EMBODIMENTS

Embodiments of the present disclosure will be described below with reference to the drawings.

Figure 1:
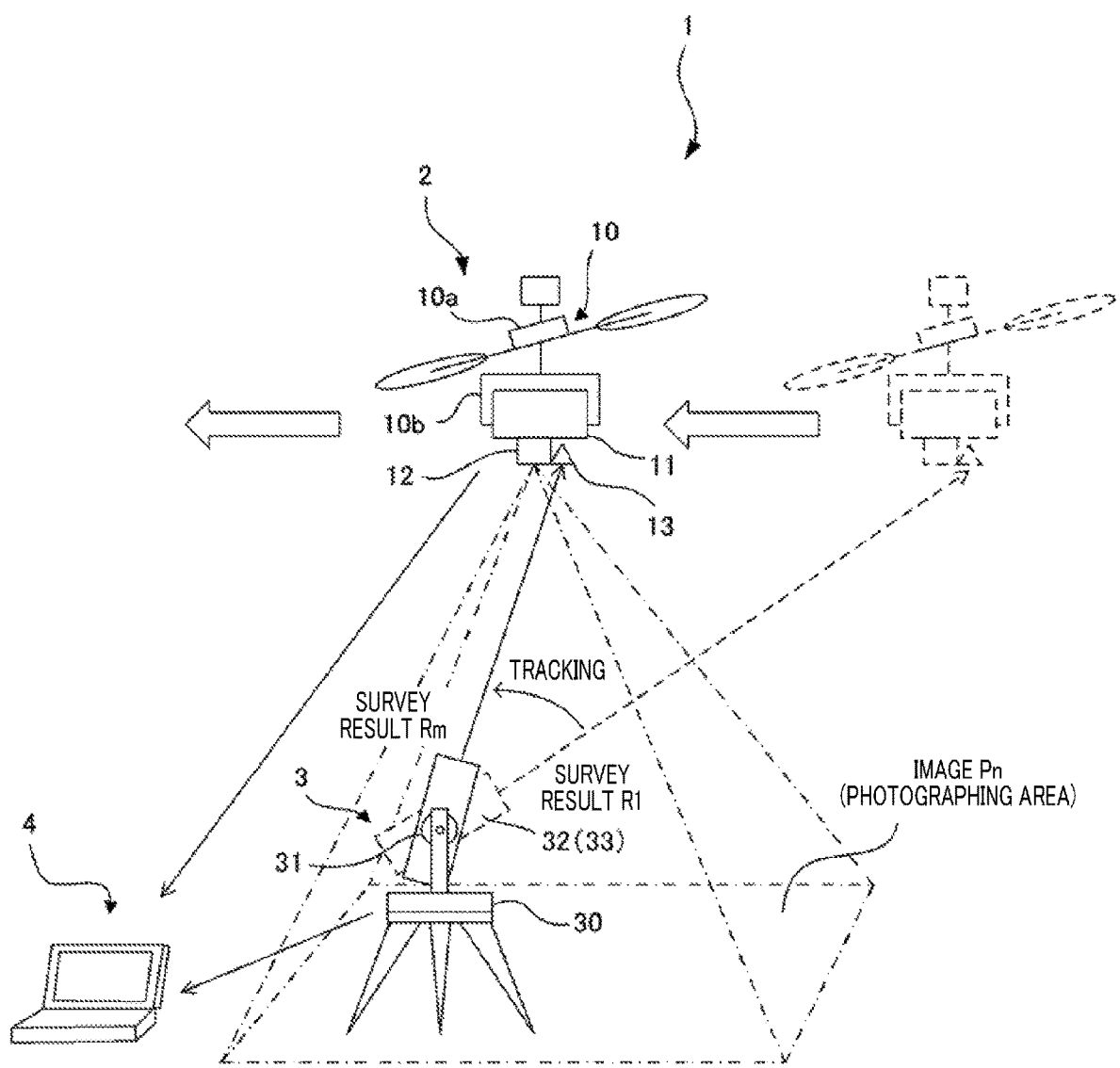
FIG. 1 is an overall configuration diagram of a survey system of one embodiment of the present disclosure.
Figure 2:
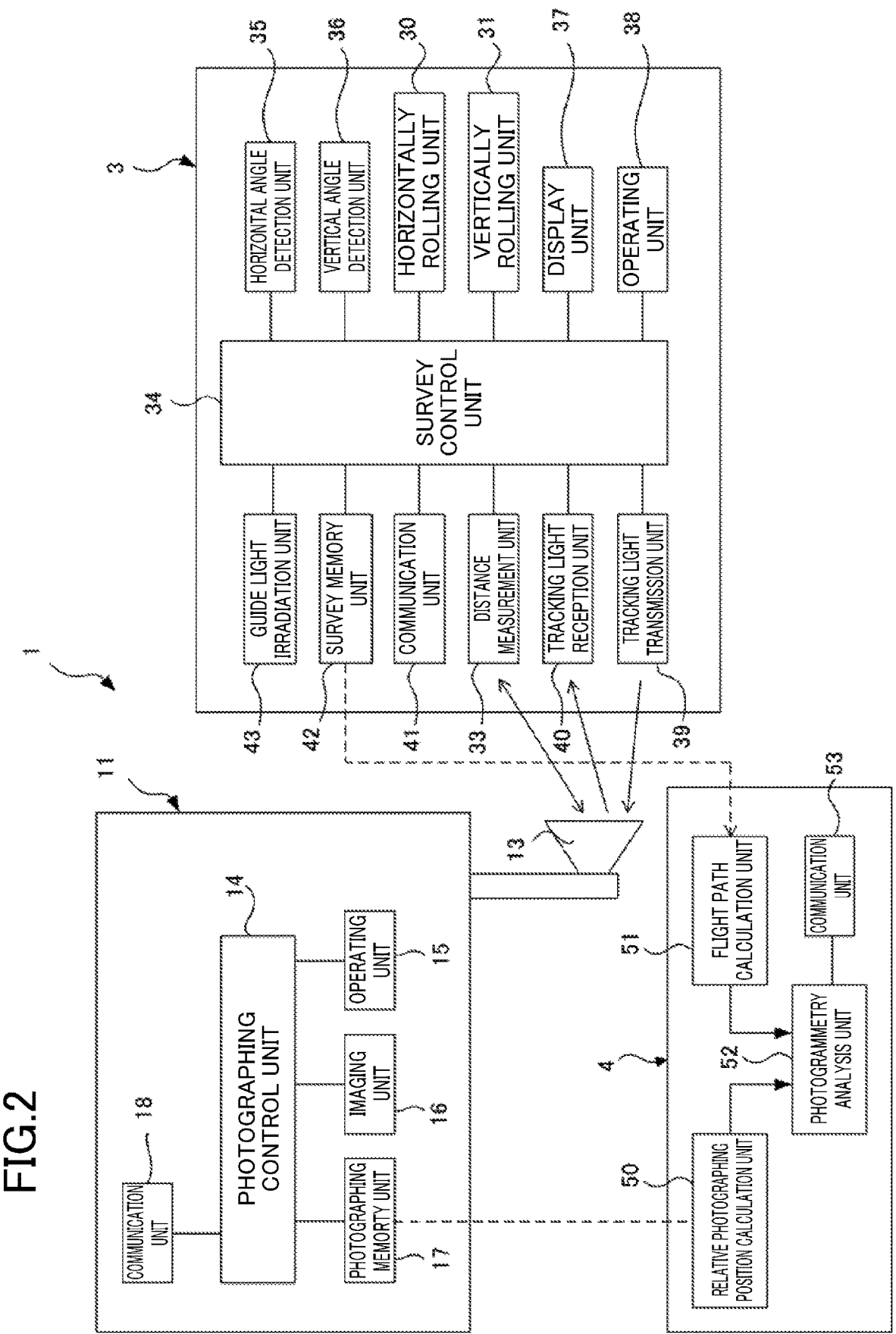
FIG. 2 is a control block diagram of the survey system of one embodiment of the present disclosure.
Figure 3:
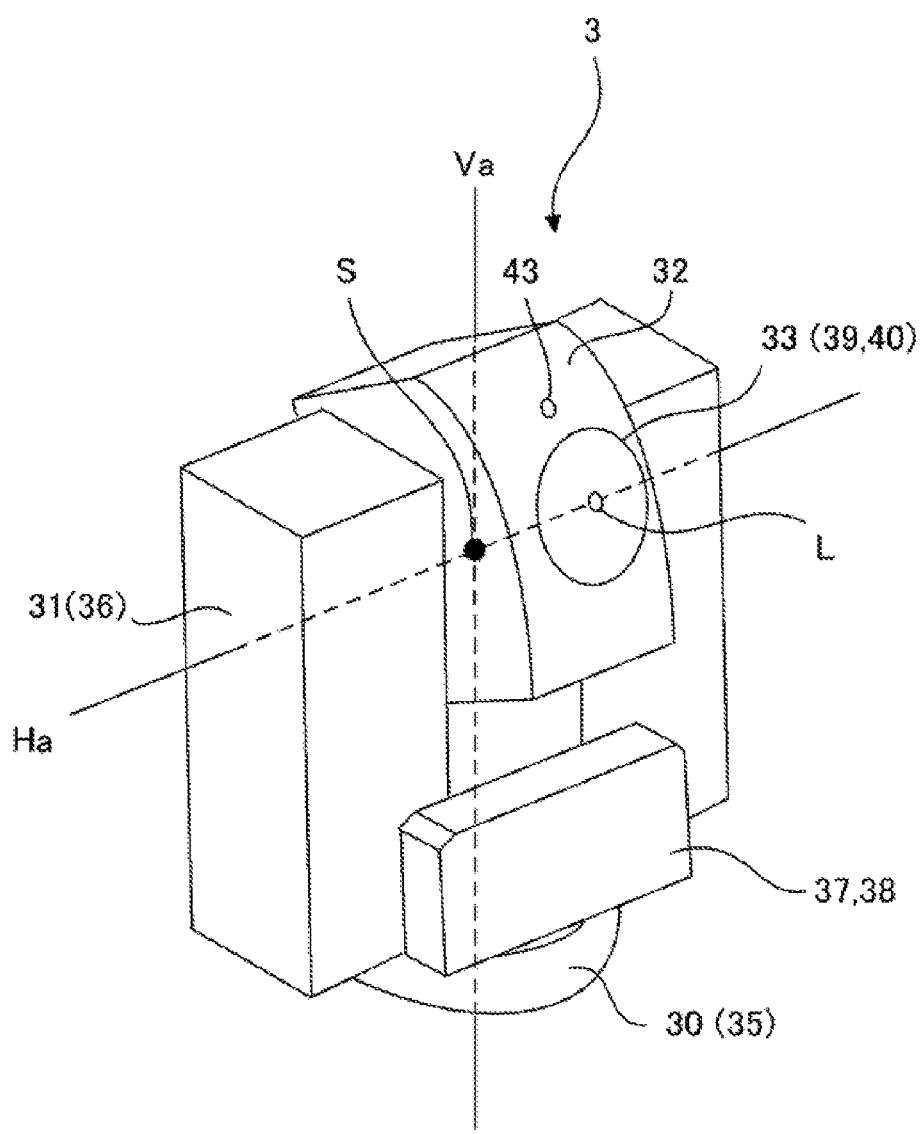
FIG. 3 is an external perspective view showing one example of a surveying device.
Figure 4A:
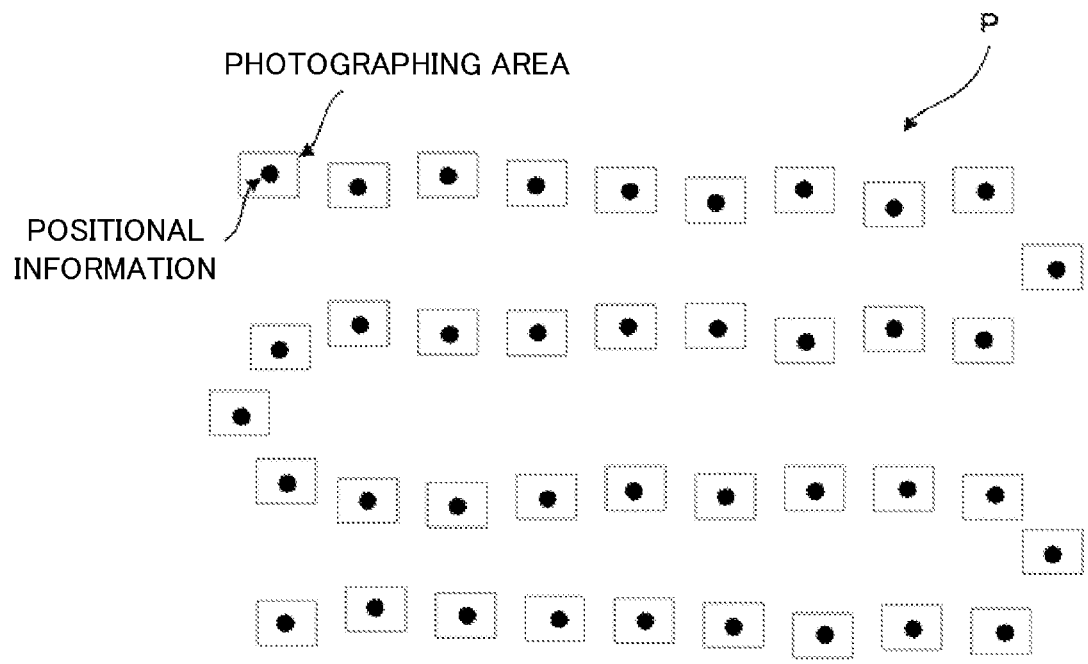
FIG. 4A illustrates one example of a point group of relative photographing positions.
Figure 4B:
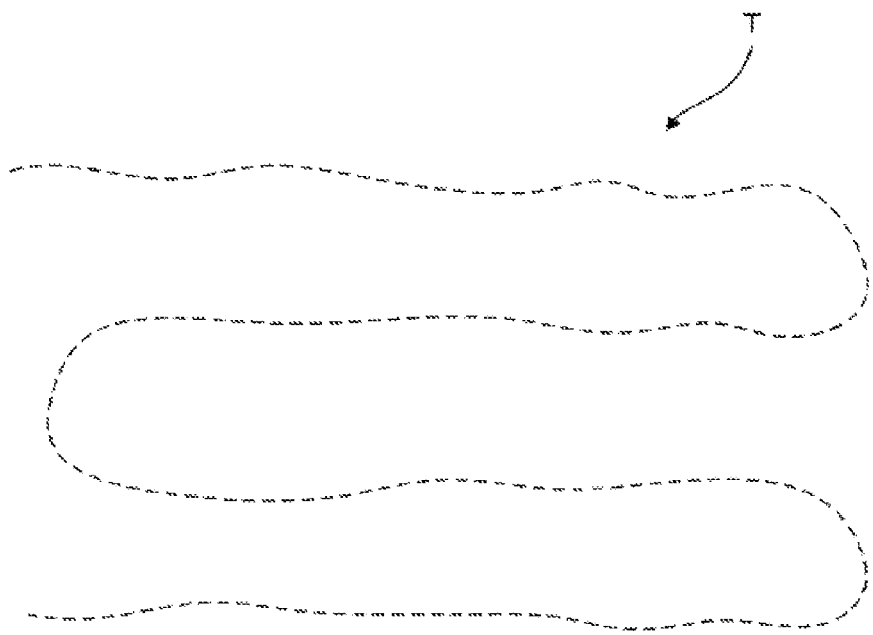
FIG. 4B illustrates one example of a flight path.

FIG. 1 is an overall configuration diagram of a survey system 1 of one embodiment of the present disclosure. FIG. 2 is a control block diagram of the survey system 1. FIG. 3 is an external perspective view showing one example of a surveying device. FIG. 4A illustrates one example of a point group of photographing positions. FIG. 4B illustrates one example of a flight path. The overall configuration and control system of the survey system 1 of the embodiment of the present disclosure will be described with reference to FIGS. 1 to 4B.

The survey system 1 is a survey system for photogrammetry, and includes a movable photographing device 2 moving to take a plurality of images for photogrammetry, a surveying device (surveying unit) 3 determining a position of the movable photographing device 2, an analysis device 4 analyzing a photographing result and a surveying result, generating data for photogrammetry, and conducting a photogrammetry analysis through the data.

The movable photographing device 2 is composed of a UAV 10, which is a movable body. The UAV 10 includes a camera 11 (a photographing unit) taking images for photogrammetry. Note that the image taken by the camera 11 may be a static image or a dynamic image.

Specifically, the UAV 10 is a flight movable body capable of flying through a predetermined flight path and freely flying by remote control. The UAV 10 includes a flight mechanism 10a for flight and a gimbal mechanism 10b provided below the flight mechanism 10a.

The camera 11 is supported by the gimbal mechanism 10b. The gimbal mechanism 10b enables the camera 11 to take images in any direction, and allows the camera 11 to have a stabilized attitude to take images in a fixed direction.

The camera 11 has a body having a front surface provided with a lens unit 12. The lens unit 12 has a front end beside which a prism 13 is provided.

The surveying device 3 is a total station provided on known positional coordinates, capable of automatically tracking a survey object. The surveying device 3 is provided with a telescope unit 32 on a horizontal rotation driving unit 30 which can be rotationally driven in the horizontal direction via a vertical rotation driving unit 31 which is rotatable in the vertical direction. The telescope unit 32 is also provided with a distance measurement unit 33 such as an electro-optical distance meter measuring a slope distance to a target.

Specifically, the surveying device 3 can perform prism survey for surveying the prism 13. That is, the surveying device 3 can measure a distance from the surveying device 3 to the prism 13, and also can measure a horizontal angle and a vertical angle formed by the surveying device 3 and the prism 13. Thus, the surveying device 3 arranged in a predetermined position and having an attitude in a leveled manner can survey the prism 13 to calculate absolute coordinates of the prism 13 from the survey result (the slope distance, the horizontal angle, the vertical angle). More specifically, the surveying device 3 has a station point serving as a reference for a survey. The absolute coordinates are calculated with reference to the known point coordinates of the station point in consideration of the instrument height with respect to the known position of the installation. Note that if the surveying device 3 cannot be installed at a known position, the coordinates of the station point may be calculated from the known reference point by the method of resection. As such, the surveying device 3 determines a position of the prism 13 provided beside the front end of the lens unit 12 of the camera 11. During or after the survey, the surveying device 3 corrects the survey result based on the center position of the lens unit 12 and the relative position of and the prism 13 to calculate a survey result of the center position of the lens of the camera 11. In the following descriptions, the survey result refers to this corrected survey result.

The analysis device 4 is an information processing terminal such as a personal computer including software for photogrammetry. Specifically, the analysis device 4 conducts setting of a flight path of the movable photographing device 2, setting of a photographing method, and data analysis. For the data analysis, the analysis device 4 associates the survey result obtained by the surveying device 3 with the photographing position of each image taken by the movable photographing device 2 to generate data for photogrammetry to conduct a photogrammetry analysis based on the data to generate a stereo model.

In the survey system 1, as illustrated in FIG. 1, the movable photographing device 2 moves along a predetermined flight path to take a plurality of images P1, P2, . . . , Pn for photogrammetry by a predetermined photographing period. These images P1, P2, . . . , Pn are photographed such that each image partially overlaps with another image adjacent thereto. With this photographing operation, the surveying device 3 tracks the camera 11 to conduct a continuous survey. Then, the analysis device 4 associates the photographing positions of the images P1, P2, . . . , Pn taken by the movable photographing device 2 with survey results R1, R2, . . . , Rm obtained by the surveying device 3, and then generates data for photogrammetry.

Next, referring to FIG. 2, the configuration of the control system based on the movable photographing device 2, the surveying device 3, and the computer of the analysis device 4, of the survey system 1, will be described.

As illustrated in FIG. 2, the movable photographing device 2 includes a photographing control unit 14. The photographing control unit 14 is electrically connected with an operating unit 15, an imaging unit 16, a photographing memory unit 17, and a communication unit 18. Note that, although not shown, the photographing control unit 14 may also be connected with a display unit etc., and may be connected with a sensor etc.

The operating unit 15 is a control means for inputting various operational instructions or settings to the photographing control unit 14. Examples of the operational instructions include instructions for turning on or off a power supply, triggering a photographing operation, switching a photographing mode, setting a photographing period, setting an image quality, and turning on or off a connection with the surveying device 3. The operating unit 15 may also include any operating or input devices such as switches, buttons, and dials.

The imaging unit 16 performs a photographing operation. The imaging unit 16 includes an imaging device (such as a CCD and a CMOS device) converting an optical image into electrical signals, and a shutter.

The photographing memory unit 17 stores a flight path of the movable photographing device 2, a timing of a photographing operation by the imaging unit 16, a program (hereinafter referred to as a photographing plan program) relating to a photographing plan including a photographing direction of the camera 11 by the gimbal mechanism 10b, data of an image taken based on the photographing plan, etc. These data and program can be input or output by communication via a storage medium such as a memory card or the communication unit 18.

The communication unit 18 can communicate with an external device, and is, for example, a wireless communication unit.

The photographing control unit 14 performs control relating to a photographing operation by the camera 11 and control relating to movement by the UAV 10. For example, the photographing control unit 14 makes the UAV 10 fly along the flight path based on the photographing plan program stored in the photographing memory unit 17. The photographing control unit 14 can control the gimbal mechanism 10b to adjust a photographing direction of the camera 11, and can control the imaging unit 16 to perform a photographing operation at a predetermined period.

The photographing control unit 14 can control the imaging unit 16 so that the imaging unit 16 performs photographing operations by a predetermined photographing period of 1 to 3 second(s). Then, the photographing control unit 14 makes the photographing memory unit 17 store the image data obtained. The photographing plan program of this embodiment involves a flight path passing over the surveying device 3, and is designed to frame the surveying device 3 in at least one of a plurality of images taken.

The surveying device 3 will be described with reference to one example of the surveying device 3 illustrated in FIG. 3. The surveying device 3 includes a survey control unit 34 connected with the horizontally rolling unit 30, the vertically rolling unit 31, the distance measurement unit 33, a horizontal angle detection unit 35, a vertical angle detection unit 36, a display unit 37 an operating unit 38, a tracking light transmission unit 39, a tracking light reception unit 40, a communication unit 41, and a survey memory unit 42.

The horizontal angle detection unit 35 detects a rolling angle of the horizontally rolling unit 30 in the horizontal direction to detect a horizontal angle collimated by the telescope unit 32. The vertical angle detection unit 36 detects a rolling angle of the vertically rolling unit 31 in the vertical direction to detect a vertical angle collimated by the telescope unit 32. The horizontal angle detection unit 35 and the vertical angle detection unit 36 detect a horizontal angle and a vertical angle, respectively, as survey results. As illustrated in FIG. 3, the intersection of the vertical axis Va serving as the reference of the horizontal angle and the horizontal axis Ha serving as the reference of the vertical angle is a station point S, and the position of this instrument point S serving as known point coordinates.

The display unit 37 is, e.g., a liquid crystal monitor. The display unit 37 can display various pieces of information such as survey results (a slope distance, a horizontal angle, a vertical angle).

The operating unit 38 is a control means for inputting various operational instructions or settings to the survey control unit 34. Examples of the operational instructions include instructions for turning on or off a power supply, triggering a survey, switching a survey mode, and setting a surveying period. Similarly to the operating unit of the camera 11, the operating unit 38 may include any operating or input devices such as switches, buttons, and dials.

The tracking light transmission unit 39 emits tracking light. The tracking light reception unit 40 receives the tracking light reflected by the prism 13. The survey control unit 34 controls the horizontally rolling unit 30 and the vertically rolling unit 31 to enable the tracking light reception unit 40 to keep receiving the tracking light from the tracking light transmission unit 39. As such, the function of tracking a target is achieved.

As illustrated in FIG. 3, The distance measurement unit 33 and the tracking light transmission unit 39 are provided in the telescope unit 32, and the distance measurement light L and the tracking light are irradiated toward the collimation direction of the telescope unit 32. The distance measurement light L and the tracking light pass on a straight line including the station point S of the surveying device 3.

The communication unit 41 can communicate with an external device, and is, for example, a wireless communication unit.

The survey memory unit 42 can store a program for the above-described tracking function; various programs for survey (e.g., a program for conducting a survey by a predetermined surveying period); and the survey data, and can transfer the stored survey data to the outside though a storage medium (such as a memory card) or a communication unit 41 (such as the communication unit 41).

The guide light irradiation unit 43 irradiates guide light for showing the operator the collimation direction of the distance measurement unit 33. The guide light is visible light irradiated in the same direction as the distance measurement light. The guide light irradiation unit 43 can change the irradiation state, e.g., can continuously switch or flash the guide light, and also and can adjust the color and light amount of the light.

The survey control unit 34 continuously determines positions of the camera 11 of the movable photographing device 2 by a predetermined surveying period such as 1 to 100 ms when tracking of the prism 13 starts. Then, the survey control unit 34 makes the survey memory unit 42 store the survey data as the survey results.

The analysis device 4 includes a relative photographing position calculation unit 50, a flight path calculation unit 51, a photogrammetry analysis unit 52, and a communication unit 53.

Specifically, the relative photographing position calculation unit 50 obtains the image data stored in the photographing memory unit 17 of the movable photographing device 2 to conduct a plot analysis of each image to calculate relative photographing positions of the images. In other words, the relative photographing positions are calculated as information about the relative positions of the images where the absolute scales (distances), positions and rotation are not defined. For example, as illustrated in FIG. 4A, the positional information is represented by a point so that the relative photographing position can be represented by a point group P. Note that in this drawing, the photographing area of the image corresponding to the relative photographing position is represented by a rectangular frame. Here, for the sake of simplification, the photographing areas are separated from each other, but actually, each image partially overlaps with another image adjacent thereto.

The flight path calculation unit 51 obtains the survey data stored in the survey memory unit 42 of the surveying device 3 to calculate the flight path (the traveling path) of the movable photographing device 2 from the survey data. The surveying device 3 tracks and surveys the camera 11 continuously by a short period. Thus, based on the survey result thus obtained, the information about the positions thereof can be represented as a flight path T of the movable photographing device 2 as illustrated in FIG. 4B, for example.

The communication unit 53 can communicate with an external device, and is, for example, a wireless communication unit. The communication unit 53 of the analysis device 4, the communication unit 18 of the camera 11, and the communication unit 41 of the surveying device 3 can communicate with one another. Thus, for example, the image data taken by the camera 11 and the survey result obtained by the surveying device 3 can be transmitted to the analysis device 4 via the communication units 18, 51, 53 after all the photographing and surveying operations, or for each photographing operation and for each surveying operation.

The photogrammetry analysis unit 52 associates a point group P of the relative photographing positions calculated by the relative photographing position calculation unit 50 with the flight path T calculated by the flight path calculation unit 51 to associate the survey result with the photographing position of the image. Further, The photogrammetry analysis unit 52 recognizes the surveying device 3 from the image containing the surveying device 3, and corrects the photographing position associated with the survey result based on the known point coordinates of the surveying device 3 to generate the data for photogrammetry.

Specifically, the photogrammetry analysis unit 52 adjusts and associates the point group P of the relative photographing positions with the flight path T to minimize a deviation therebetween to calculate the absolute photographing positions of the images, i.e., the absolute coordinates of the photographing positions. Then, the photogrammetry analysis unit 52 further recognizes the surveying device 3 from the image in which the surveying device 3 is framed, in the data of a plurality of images taken by the movable photographing device 2, and corrects the absolute coordinates of the photographing position based on the known point coordinates of the surveying device 3 to generate the data for photogrammetry. Then, the photogrammetry analysis unit 52 conducts photogrammetry analysis based on this data for photogrammetry to generate a stereo model.

Figure 5:
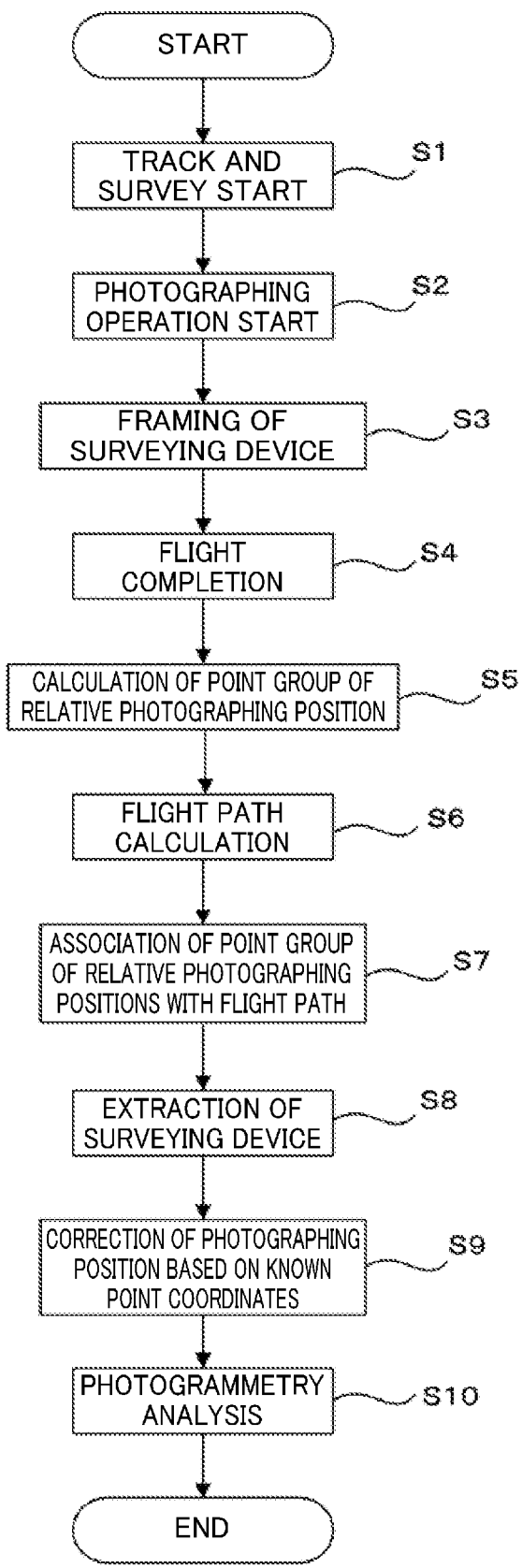
FIG. 5 is a flow chart showing a routine for generating photogrammetry data in the survey system of one embodiment of the present disclosure.
Figure 6:
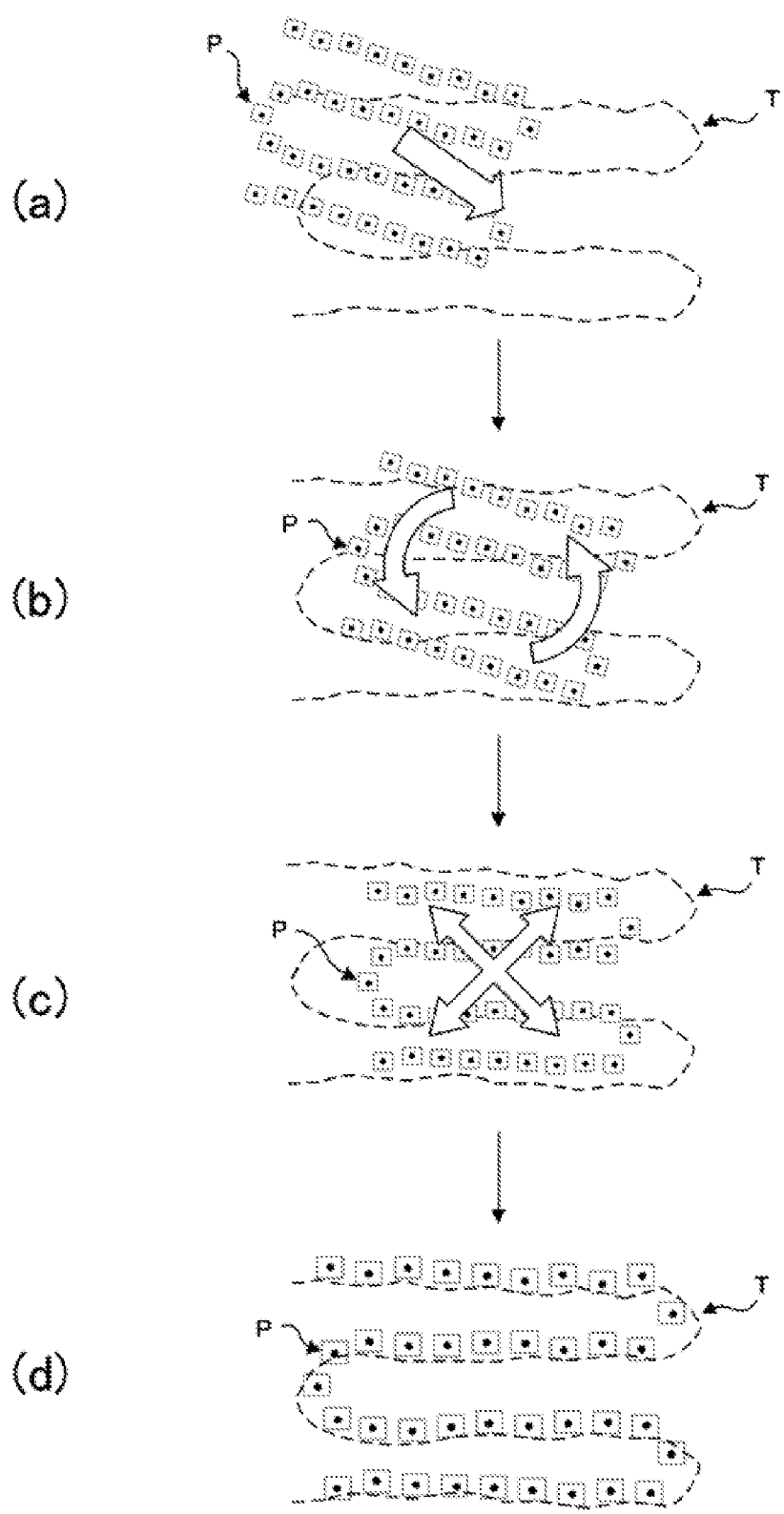
FIG. 6 illustrates one example of procedures (a) to (d) for associating a point group at a relative photographing position and a flight path.
Figure 7:
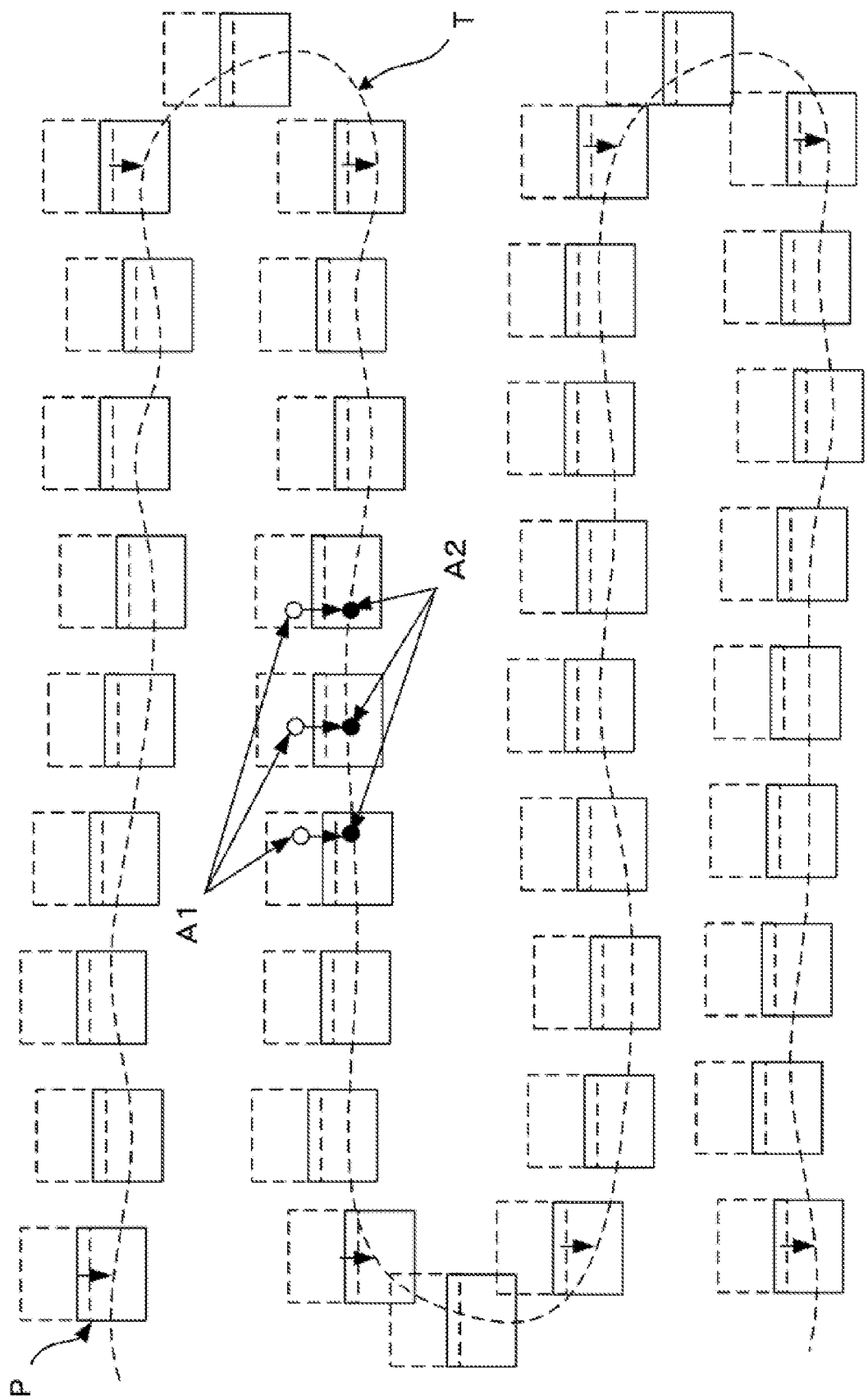
FIG. 7 illustrates one example of correction procedures with known point coordinates based on the surveying device.

Here, FIG. 5 is a flow chart showing a photogrammetry routine in the survey system of this embodiment. FIG. 6 illustrates one example of procedures (a) to (d) for associating the point group of the relative photographing positions with the flight path. FIG. 7 illustrates one example of a correction procedure based on the known point coordinates. A methodology for generating the data for photogrammetry in the survey system of the embodiment will now be described along the flow chart in FIG. 5, with reference to FIGS. 6 and 7.

First, suppose the following setting to start the photogrammetry routine shown in FIG. 5. The movable photographing device 2 is set to fly along the meandering path illustrated in FIG. 4B and conduct photographing operations with the camera 11 by a predetermined photographing period, in the sky above the target areas for photogrammetry, according to the photographing plan program.

In Step S1 of the photogrammetry routine, the surveying device 3 starts to track and survey the movable photographing device 2.

Then, in Step S2, the movable photographing device 2 starts to conduct photographing operations through the camera 11.

In Step S3, during a photographing operation based on the photographing plan program, the movable photographing device 2 takes at least one image in which the surveying device 3 is framed.

Then, in Step 4, the movable photographing device 2 completes a flight along the predetermined flight path to finish all the photographing operations. Here, the analysis device 4 receives the image data stored in the image memory unit 17 of the camera 11 and the survey data stored in the survey memory unit 42 of the surveying device 3.

Then, in Step S5, the relative photographing position calculation unit 50 of the analysis device 4 calculates the point group of the relative photographing positions as illustrated in FIG. 4A based on the image data.

In Step S6, the flight path calculation unit 51 of the analysis device 4 calculates the flight path T of the movable photographing device 2 as illustrated in FIG. 4B based on the survey data.

Then, in Step S7, The photogrammetry analysis unit 52 associates the point group of the relative photographing positions calculated in Step S5 with the flight path calculated in Step S6.

The procedure for this association will be specifically described below. First, as shown in the procedure (a) in FIG. 6, the photogrammetry analysis unit 52 superimposes the point group P of the relative photographing positions upon the flight path T. Then, the photogrammetry analysis unit 52 moves the point group P to match the center positions of the point group P and the flight path T.

After generally having matched the central positions, as shown in the procedure (b) in FIG. 6, the photogrammetry analysis unit 52 rotates the point group P to match the orientation of the point group P of the relative photographing positions and the orientation of the flight path T, e.g., to match the directions of extension of the generally straight line portions thereof.

After generally having matched the orientations of the point group P and the flight path T, as shown in the procedure (c) in FIG. 6, the photogrammetry analysis unit 52 enlarges the point group P to put the point group P of the relative photographing positions on the flight path T. Note that the point group P is downsized if the point group P is larger than the flight path T.

Further, as shown in the procedure (d) in FIG. 6, after having finely adjusted (i.e., moved, rotated, and enlarged or downsized) the point group P, the photogrammetry analysis unit 52 generally matches the point group P of the relative photographing positions with the flight path T.

As such, the photogrammetry analysis unit 52 adjusts the point group P of the relative photographing positions to the flight path T to minimize the deviation therebetween to associate the survey result matching each relative photographing position with the absolute coordinates of the relative photographing position. Note that all the points of the relative photographing positions might not always match the flight path. If there is no survey result matching the relative photographing position in the flight path, a survey result closest to the relative photographing position is assigned as the relative photographing position.

Then, in Step S8, the photogrammetry analysis unit 52 recognizes the surveying device 3 from the image in which the surveying device 3 is framed, in the data of a plurality of images taken by the camera 11. Specifically, the photogrammetry analysis unit 52 extracts a preset feature indicated by the surveying device 3 to recognize the surveying device 3. For example, in this embodiment, the photogrammetry analysis unit 52 sets a distance measurement light L irradiated from the surveying device 3 as a feature indicated by the surveying device 3, and regards this feature as a reference mark to recognize the surveying device 3. That is, the photogrammetry analysis unit 52 extracts a light point (e.g., a red point) indicating the distance measurement light L framed in the image to recognize the position of the light point as a position of the surveying device 3.

Then, in Step S9, the photogrammetry analysis unit 52 corrects the photographing position associated with the survey result in step S7, based on the position of the surveying device 3 recognized in step S8, i.e., the known point coordinates in the station point P.

Specifically, as illustrated in FIG. 7, the photogrammetry analysis unit 52 determines a difference value between a coordinates A1 of the surveying device 3 based on the photographing position after the association in step S7 and a known point coordinates A2 of the surveying device 3. Then, a position displaced toward the known point coordinates A2 by the difference value with respect to the photographing position associated in Step S7 is set as absolute coordinates of the final photographing position. An image to which the absolute coordinates are assigned in this manner is used as the data for photogrammetry.

Note that FIGS. 6 and 7 illustrate only the two-dimensional adjustments for the sake of illustration. In practice, three-dimensional adjustments are required. FIGS. 6 and 7 also illustrate conceptual diagrams for the brief descriptions. Each adjustment herein is merely one example. Other typical adjustments (or matching) are applicable. The adjusting operations and fine adjustments automatically conducted by the photogrammetry analysis unit 52 in FIGS. 6 and 7 may be manually conducted by an operator. In FIG. 7, for the sake of clarity, the difference between the photographing position after the association and the photographing position after the correction is shown larger than the actual one.

In Step S10 of FIG. 5, the photogrammetry analysis unit 52 conducts photogrammetry analysis based on the data for photogrammetry generated in Step 9 to generate a stereo model where the absolute scales (distances), positions, and rotation are defined. Then, the routine is ended.

As described above, the survey system 1 of this embodiment calculates the point group P of the relative photographing positions from the images taken by the camera 11 of the movable photographing device 2, and calculates the flight path T from the survey result obtained by the surveying device 3. Then, the survey system 1 associates this point group P with the flight path T to associate the survey result with the photographing position of the image.

Then, the photogrammetry analysis unit 52 also recognizes the surveying device 3 from the image in which the surveying device 3 is framed, and corrects the photographing position based on the known point coordinates of the surveying device 3. That is, the surveying device 3 is used as a control point.

As such, the photographing position associated with the survey result obtained by the surveying device 3 is corrected based on the known point coordinates of the surveying device 3, such that more accurate absolute coordinates can be obtained as the photographing position of the image. For this correction, it is only necessary to arrange the surveying device 3 in a known position to frame the surveying device 3 in the image taken. Thus, without an extra work, e.g., extra installation of air marks, the accuracy of photogrammetry can be improved easily.

The photogrammetry analysis unit 52 recognizes the surveying device 3 framed in the image by extracting the preset feature indicated by the surveying device 3. Because of such a presetting of the feature recognized the surveying device 3, the surveying device 3 can perform the recognition easily.

In particular, according to this embodiment, the photogrammetry analysis unit 52 defines the distance measurement light L that the surveying device 3 irradiates from the surveying device 3 toward the camera 11 to measure the position of the camera 11 as a feature indicated by the surveying device 3, and regards this feature as a reference mark to extract the surveying device 3. The surveying device 3 tracks and surveys the camera 11, and the distance measurement light L is always irradiated toward the camera 11. Thus, the distance measurement light L is easily recognized as a feature indicated by the surveying device 3. Thus, such a distance measurement light L is regarded as a reference mark so that the surveying device 3 can be easily recognized from the image.

The description of the embodiment of the present disclosure is now ended, but the aspect of the present disclosure is not limited to this embodiment.

In the above embodiment, the photogrammetry analysis unit 52 uses the distance measurement light L as a feature framed in the image to recognize the surveying device 3, but the feature indicated by the surveying device 3 is not limited to this one.

For example, as a feature indicated by the surveying device 3, the tracking light may be used in addition to the distance measurement light, and guide light indicating the collimation direction of the surveying device 3 may be used. Like the distance measurement light, the guide light is oriented to the camera 11 during the tracking survey, and has a high degree of freedom so that an irradiation state, a light color, and a light amount can be adjusted. Thus, the surveying device 3 can be more easily recognized. Note that the guide light does not pass through the station point S, and thus it is necessary to correct a deviation between the guide light irradiation unit 43 and the station point S to obtain the known point coordinates. In the above embodiment, the surveying device 3 includes only one guide light irradiation unit 43, but may include a plurality of guide light irradiation units 43. It is possible to improve the accuracy of correction of the deviation between the guide light irradiation unit and the station point by providing the plurality of the guide light irradiation units.

The feature indicated by the surveying device for recognizing the surveying device is not limited to this one. FIGS. 8A to 8D illustrates first to fourth variations of the feature indicated by the surveying device. These variations will be described below with reference to these drawings.

Figure 8A:
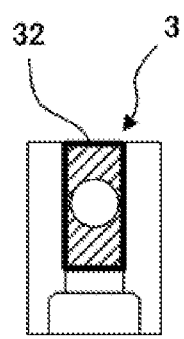
FIG. 8A illustrates a first variation of a visual feature for recognizing the surveying device from the image.

FIG. 8A is a schematic front view of the telescope unit of the surveying device. FIG. 8A illustrates the first variation in which the photogrammetry analysis unit 52 sets visual features such as an outer shape (a thick line) and a color (a hatched area) of the telescope unit 32 as features indicated by the surveying device 3. Thus, it is possible to extract the surveying device 3 from the image taken in a state in which the light such as the distance measurement light is not irradiated on the camera 11. Note that the visual features are not limited to those described above, and the outer shape and color of a part or entirety of the other part of the surveying device 3 may be set.

The surveying device 3 may be provided with a marker member, which may be set as a feature indicated by the surveying device 3. This can ensure the extraction of the surveying device 3.

Figure 8B:
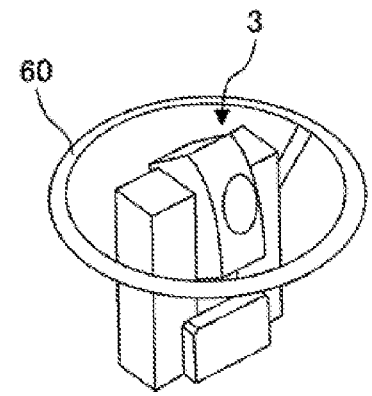
FIG. 8B illustrates a second variation of the visual feature for recognizing the surveying device from the image.

For example, as shown in the second variation of FIG. 8B, at the same height position as the station point of the surveying device 3, a ring-shaped marker member 60 centered on the station point may be provided to surround the surveying device 3. As such, the marker member 60 framed larger in the image than the surveying device 3 enables the photogrammetry analysis unit 52 to more easily recognize the surveying device 3. In particular, in the second variation, the ring-shaped marker member 60 is at the same height as the station point of the surveying device 3, and has a center at the same position as the station point. Thus, the photogrammetry analysis unit 52 can obtain the position of the station point, i.e., the known point coordinates of the surveying instrument 3 without a correction calculation. Note that the marker member is not limited to a ring shape, and may have, e.g., an arc shape, such as a semi ring shape, which is made by cutting a part of the circular shape.

Figure 8C:
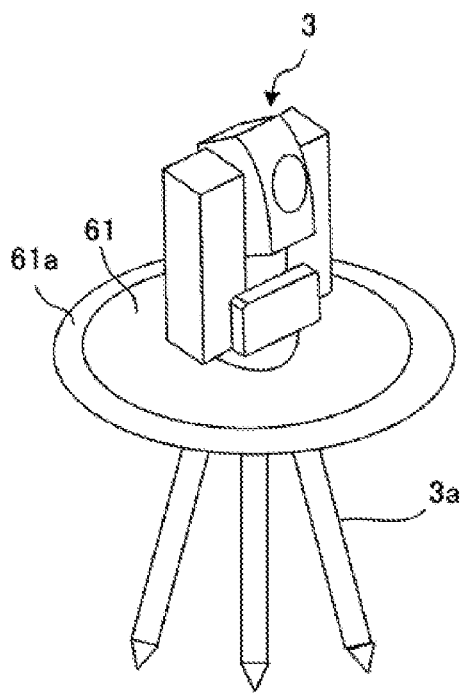
FIG. 8C illustrates a third variation of the visual feature for recognizing the surveying device from the image.

In the third variation of FIG. 8C, a disc-shaped marker member 61 is provided between a main body of the surveying device 3 and a tripod 3a supporting the surveying device 3. The marker member 61 includes a peripheral edge 61a and a center part, which have different colors from each other for easy recognition. The disc-shaped marker member 61 has the center positioned on a vertical line containing the station point of the surveying device 3. Similarly to the second variation, this enables the photogrammetry analysis unit 52 to more easily recognize the surveying device 3. The center is positioned on the vertical line containing the station point, and thus the position of the station point can be calculated only with the correction in a height direction. This correction in the height direction may be conducted by using a mechanical dimension of the surveying device 3, or the surveying device 3 itself may measure the position of the marker member 61.

Figure 8D:
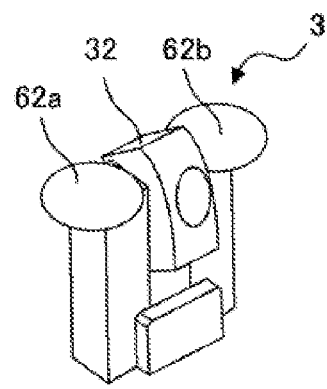
FIG. 8D illustrates a fourth variation of the visual feature for recognizing the surveying device from the image.

As shown in the fourth variation in FIG. 8D, the surveying device 3 may be provided with a plurality of marker members 62a, 62b. In FIG. 8D, the surveying device 3 has a pair of disk-shaped marker members 62a, 62b, which are provided on upper ends of the right and left support members supporting the telescope unit 32. The pair of marker members 62a, 62b are provided so that the vertical line passing through the station point is positioned at a mid point of a straight line connecting the attachment positions of the respective marker members. This provides the same advantage as that of the third variation. Note that in the fourth variation, the pair of marker members 62a, 62b are provided in the surveying device 3, but the number of the maker members is not limited to two. As long as the station point is at a specified position, more marker members may be provided.

The embodiment and variations may be combined to set the feature indicated by the surveying device 3.

In addition, in the embodiment described above, the movable photographing device 2 is composed of the UAV 10 as a movable body. However, the movable body is not limited thereto. For example, the movable body may be a manned flying body such as a helicopter or an airplane; or a movable body moving on the ground, such as a vehicle or a human. The data for photogrammetry may be generated from association of the traveling path of the movable body with the point group of the photographing positions.

In the embodiment described above, the relative photographing position calculation unit 50 and the flight path calculation unit 51 are provided on the analysis device 4. For example, the relative photographing position calculation unit may be provided in the movable photographing device, and the flight path calculation unit may be provided in the surveying device. The surveying device may have all the functions of the analysis device.

In the embodiment described above, the flight path is set so that the movable photographing device 2 passes over the surveying device to frame the surveying device 3 in the image. However, the flight path is not limited thereto. For example, the orientation of the camera may be changed during a flight to fame the surveying device in the image.

In the embodiment described above, the photogrammetry analysis unit 52 associates the point group P of the relative photographing position with the flight path T to associate the survey result with the photographing position of the image. However, the way of associating the survey result with the photographing position of the image is not limited thereto.

For example, the photographing time for every photographing operation conducted by the camera 11 of the movable photographing device 2 is memorized, and the surveying time for every survey conducted by the surveying device 3 is memorized. Then, based on the photographing time and the surveying time, the survey result may be associated with the photographing position of the image.

What is claimed is:

1. A survey system, comprising:
    a photographing unit provided in a movable body and taking a plurality of images for photogrammetry, each image partially overlapping with another image adjacent thereto;
    a surveying unit provided in a known position, having a known point coordinates, tracking the photographing unit, and determining a position of the photographing unit;
    a photographing control unit controlling the movable body and the photographing unit to take at least one image containing the surveying unit in taking the plurality of images for photogrammetry;
    a relative photographing position calculation unit obtaining image data stored in a photographing memory unit of the photographing unit and calculating a point group of relative photographing positions indicating relative positions of the images;
    a travelling path calculation unit obtaining survey data stored in a survey memory unit of the surveying unit and calculating a traveling path of the movable body; and
    a photogrammetry analysis unit associating the point group of relative photographing positions with the traveling path to associate a survey result obtained by the surveying unit with a photographing position of each image taken by the photographing unit, recognizing the surveying unit from the at least one image containing the surveying unit, correcting absolute coordinates of the photographing position based on the known point coordinates of the surveying unit, and generating data for photogrammetry.

2. The survey system of claim 1, wherein
    the photogrammetry analysis unit extracts a preset feature indicated by the surveying unit from the at least one image containing the surveying unit to recognize the surveying unit.

3. The survey system of claim 2, wherein
    the photogrammetry analysis unit sets a distance measurement light irradiated from the surveying unit toward the photographing unit to measure a distance to the photographing unit as a feature indicated by the surveying unit.

4. The survey system of claim 2, wherein
    the photogrammetry analysis unit sets guide light indicating a collimating direction of the surveying unit as a feature indicated by the surveying unit.

5. The survey system of claim 2, wherein
the photogrammetry analysis unit sets at least any of an outer shape and color of a part or entirety of the surveying unit as a feature indicated by the surveying unit.

6. The survey system of claim 2, wherein
the surveying unit is provided with a marker member, and
the photogrammetry analysis unit sets the marker member as a feature indicated by the surveying unit.

7. The survey system of claim 6, wherein
the marker member, in the surveying unit, is a circular or arc-shaped member having a center on a vertical line passing through a station point corresponding to the known point coordinates.

8. The survey system of claim 7, wherein
the marker member includes a circular or arc-shaped section positioned at the same height as the station point.

9. The survey system of claim 7, wherein
the marker member, in the surveying unit, includes a plurality of marker members provided at a plurality of places in which the station point corresponding to the known point coordinates can be specified.

* * * * *